United States Patent Office 2,872,483
Patented Feb. 3, 1959

---

2,872,483

1,2,3,4,7,7-HEXACHLORO-5-N-ALKYL CARBOX-AMIDE BICYCLO [2.2.1]-2-HEPTENE

Herman S. Bloch, Chicago, Ill., assignor to Universal Oil Products Company, Des Plaines, Ill., a corporation of Delaware No Drawing. Application December 15, 1954
Serial No. 475,571

6 Claims. (Cl. 260—557)

This invention relates to bicyclic olefinic compounds containing various substituents in the structure, said compounds being useful as chemical intermediates and as a toxicant ingredient of insecticidal and herbicidal compounds.

More specifically this invention relates to unsaturated bicyclic compounds formed by the process which involves the condensation of a polyhalocycloalkadiene with an amide of an unsaturated aliphatic acid.

An object of this invention is to provide polyhalo-substituted unsaturated bicyclic compounds which are useful as insecticides and herbicides.

A further object of this invention is to provide halogen-substituted unsaturated bicyclic compounds prepared by considering a polyhalocycloalkadiene with an amide of an unsaturated aliphatic acid, said compounds being useful as a means of controlling pestiologically active organisms.

In one embodiment the present invention concerns a process for preparing a bicyclic olefinic compound having the general formula:

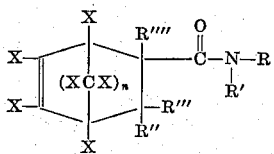

in which $n$ is 1 or 2, R comprises an alkyl radical consisting of from about 1 to 6 carbon atoms, R' is selected from group consisting of hydrogen, alkyl or haloalkyl radicals containing from 1 to 6 carbon atoms, R'', R''', and R'''' are independently selected from the group consisting of hydrogen, alkyl and haloalkyl radicals and each X is independently selected from the group consisting of hydrogen and halogen radicals, by condensing a polyhalocycloalkadiene with an amide of an unsaturated aliphatic acid containing from 3 to 5 carbon atoms.

Another embodiment of this invention resides in a method of controlling pestiologically active organisms by treating said organisms with a bicyclic olefinic compound having the formula:

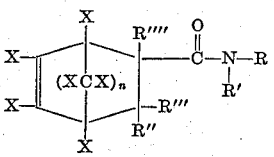

in which $n$ is 1 or 2, R comprises an alkyl radical consisting of from about 1 to 6 carbon atoms, R' is selected from group consisting of hydrogen, alkyl or haloalkyl radicals containing from 1 to 6 carbon atoms, R'', R''' and R'''' are independently selected from the group consisting of hydrogen, alkyl and haloalkyl radicals and each X is independently selected from the group consisting of hydrogen and halogen radicals.

A specific embodiment of this invention resides in a process for the preparation of a bicyclic olefinic compound by condensing hexachlorocyclopentadiene with the amide of an unsaturated aliphatic acid containing from 3 to 5 carbon atoms.

A more specific embodiment of this invention resides in a process for preparing a bicyclic olefinic compound which comprises condensing hexachlorocyclopentadiene with N-t-butyl acrylamide, and recovering the resultant 1,2,3,4,7,7-hexachloro-5-N-t-butyl carboxamide bicyclo [2.2.1]-2-heptene.

Another specific embodiment of this invention is found in a method of controlling pestiologically active organisms by treating said organisms with a compound comprising 1,2,3,4,7,7-hexachloro-5-N-t-butyl carboxamide bicyclo [2.2.1]-2-heptene.

Yet another specific embodiment of this invention resides in a new composition of matter comprising 1,2,3,4, 7,7-hexachloro-5-N-t-butyl carboxamide bicyclo [2.2.1]-2-heptene.

Other objects and embodiments concerning alternative polyhalocyloalkadienes and amides of unsaturated aliphatic acids containing from 3 to 5 carbon atoms will be found in the following further detailed description of this invention.

As hereinbefore indicated, the products of this invention comprise a bicyclic olefinic compound of the formula:

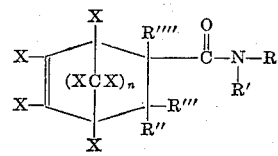

in which R, R', R'', R''', R'''', $n$ and X comprise radicals of the character hereinbefore set forth, such products being formed by condensing a polyhalocycloalkadiene with an amide of an unsaturated aliphatic acid.

Examples of polyhalocycloalkadienes which may be used in this invention include dichlorocyclopentadiene, trichlorocyclopentadiene, tetrachlorocyclopentadiene, pentachlorocyclopentadiene, hexachlorocyclopentadiene, dibromocyclopentadiene, tribromocyclopentadiene, tetrabromocyclopentadiene, pentabromocyclopentadiene, hexabromocyclopentadiene, difluorocyclopentadiene, trifluorocyclopentadiene, tetrafluorocyclopentadiene, pentafluorocyclopentadiene, hexafluorocyclopentadiene, dichlorocyclohexadiene, trichlorocyclohexadiene, tetrachlorocyclohexadiene, pentachlorocyclohexadiene, hexachlorocyclohexadiene, etc., the di-, tri-, tetra-, penta-, hexa-, etc. bromo- and fluorocyclohexadienes, etc.

The amides of unsaturated aliphatic acids containing not over 5 carbon atoms which may be represented by the formula:

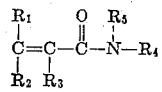

in which $R_1$, $R_2$ and $R_3$ comprise hydrogen, alkyl or haloalkyl radicals, the total number of carbon atoms ranging from 0 to 2, $R_4$ is an alkyl radical of from 1 to 6 carbon atoms, and $R_5$ is a hydrogen, alkyl or haloalkyl group of 1 to 6 carbon atoms, include N-methyl acrylamide, N-ethyl acrylamide, N-propyl acrylamide, N-isopropyl acrylamide, N-butyl acrylamide, N-isobutyl acrylamide, N-t-butyl acrylamide, N-amyl acrylamide, N-isoamyl acrylamide, N-t-amyl acrylamide, N-hexyl acrylamide, N-methyl methacrylamide, N-ethyl methacrylamide, N-propyl methacrylamide, N-isopropyl methacrylamide, N-butyl methacrylamide, N-isobutyl methacrylamide, N-t-butyl methacrylamide, N-amyl methacrylamide, N-t-amyl methacrylamide, N-hexyl methacrylamide, N-isohexyl methacrylamide, N-t-hexyl methacrylamide, N-methyl-α-methylcrotonamide, N-ethyl-α-methylcrotonamide, N-propyl-α-methylcrotonamide, N-isopropyl-α-methylcrotonamide, N-butyl-α-methylcrotonamide, N-isobutyl-α-methylcrotonamide, N-t-butyl-α-methylcrotonamide, N - amyl - α - methylcrotonamide, N-t-amyl-α-methylcrotonamide, N-hexyl-α-methylcrotonamide, N-methyl crotonamide, N-ethyl crotonamide, N-propyl crotonamide, N-isopropyl crotonamide, N-butyl crotonamide, N-isobutyl crotonamide, N-t-butyl crotonamide, N-amyl crotonamide, N-isoamyl crotonamide, N-t-amyl crotonamide, N-hexyl crotonamide, N-methyl-α-chloromethylacrylamide, N-ethyl-α-chloromethylacrylamide, N-propyl-α - chloromethylacrylamide, N-isopropyl-α-chloromethylacrylamide, N-t-butyl-α-chloromethylacrylamide, etc.; N-methyl-α,β-dichloromethylacrylamide, N-ethyl-α,β-dichloromethylacrylamide, N-propyl-α,β-dichloromethylacrylamide, N-isopropyl-α,β-dichloromethylacrylamide, N-t-butyl-α,β-dichloromethylacrylamide, N,N-dimethylacrylamide, N,N-diethylacrylamide, N,N-dipropylacrylamide, N,N-diisopropylacrylamide, N,N-dibutylacrylamide, N,N-diisobutylacrylamide, N-methyl-N-t-butylacrylamide, etc.; N-methyl-γ-chlorocrotonamide, N-ethyl-γ-chlorocrotonamide, N-propyl-γ-chlorocrotonamide, N-isopropyl-γ-chlorocrotonamide, N-butyl-γ-chlorocrotonamide, N-isobutyl - γ - chlorocrotonamide, N-t-butyl-γ-chlorocrotonamide, etc.; N-methyl-α-dichloromethylacrylamide, N-ethyl-α-dichloromethylacrylamide, N-propyl-α-dichloromethylacrylamide, N - isopropyl-α-dichloromethyl-acrylamide, etc.; the N-alklyl and N,N-dialkyl dichloro-, trichloro-substituted crotonamides, etc.

The condensation reaction provided herein, that is, between the polyhalocycloalkadiene and the amide of the unsaturated aliphatic acid containing from 3 to 5 carbon atoms is generally effected at elevated temperatures in the range of from about 50° to 200° C., the preferred range being that of from about 100° to 175° C. Use of super-atmospheric pressure, generally in excess of about 2 atmospheres is advantageous in providing an essentially liquid phase reaction mixture. In order to provide such pressure within the reaction vessel, a gas such as nitrogen or other inert gases may be charged into the reaction vessel at the desired pressure until the optimum degree of condensation has occurred.

The process of the present invention may be effected in any suitable manner and may comprise either a batch or continuous type operation. When a batch type operation is used, a quantity of the reactants, namely the cyclic diene or polyhalocycloalkadiene and the amide of the unsaturated aliphatic acid are placed in an appropriate condensation apparatus containing mixing and heating means. The reaction vessel is heated to the desired temperature and maintained at such temperature for a predetermined residence time. At the end of this time the reaction vessel and contents are allowed to cool to room temperature and the reaction product separated by conventional means such as fractional distillation, crystallization, etc.

The product of this invention may also be prepared by a continuous process wherein the reactants are continuously charged to a reaction vessel maintained at the proper operating conditions of temperature and pressure and a product stream is continuously withdrawn from the reactor. The withdrawn condensation product is separated from unreacted starting materials and/or unwanted side reaction products which may have formed and purified by conventional means while the unreacted compounds are recycled for further use as a portion of the feed material.

The basic properties of the present polyhalocycloalkadiene-N-alkyl acrylamide condensation products and the effects they have on entomological forms of life make them particularly desirable as insecticides, insect repellants and also plant growth regulators, the particular compounds having many of the features desired of materials for this purpose. They are, for example, toxic to insects which are destructive of plant life and materials normally subject to insect infestation, their toxic effects being manifested by contact of the poison with the insect. The insecticides comprising the present compounds are thus effective against chewing as well as sucking types of insects. The compounds are sufficiently volatile so that when they have been applied to plant life intended for subsequent human consumption, the plants, after harvesting and allowance of a reasonable time for evaporation of the applied insecticide therefrom, retain none of the toxicant to prevent use of the plant for consumption as food. On the other hand, the compounds are of sufficiently limited volatility to be retained on the insect for the time required to accomplish the toxic effects of the compounds. The volatility and retentive capacity of the compounds may be varied at will by combining them with suitable fixing agents which reduce or promote their volatilization, as desired. Thus, the compounds may be dissolved in a suitable high boiling solvent, such as a mineral or vegetable oil, petroleum, etc., a wax such as paraffin, beeswax, etc.; a high molecular weight alcohol or ether such as myricyl alcohol, dibutyl ether, etc.; or they may be emulsified with water or combined with an oil and emulsified with water by the addition of an emulsifying agent, such as a surface active agent, to the mixture of components. The latter solvents and dispersants may also be employed for the specific purpose of reducing the concentration of insecticide to the desired level in a specific insecticide formulation. The particular formulation of active components in combination with the solvent or dispersant will depend upon its application. Compositions containing as high as 20% of active component may be preferred in some instances where deep penetration of the insecticide is desired, as in the treatment of fibrous material, such as wood, for extinction of a particular infestation, for example, wood termites. For other purposes, the required concentration of active components in the formulation may be as low as 0.1% as for example in the treatment of fabrics for destroying moth larvae. In utilizing the present insecticidal compounds against most insects, a composition containing from about 0.1% to about 5% by weight of the active component is highly effective. The choice of the most desirable solvent or dispersant further depends upon the method utilized to apply the insecticidal composition to the infested article. For example, a low molecular weight, normally gaseous carrying agent for the active insecticidal component, such as propane, butane, the Freons, etc., may be compressed and liquefied into a small bomb containing the insecticides. Upon release of pressure from the bomb, the liquefied carrier vaporizes and suspends a quantity of the active component therein, thus providing a convenient spraying method of applying the insecticide. The active component may also be dissolved in a liquid carrier, such as kerosene, an alcohol, ester, ketone, etc. and the resulting solution atomized by a suitable spraying device.

Examples of bicyclic olefinic compounds comprising new compositions of matter which may be prepared according to the reaction of this invention include 1,2,3,4,-7,7-hexachloro-5-N-methyl carboxamide bicyclo [2.2.1]-2-heptene, 1,2,3,4,7,7-hexachloro-5-N-ethyl carboxamide bicyclo [2.2.1] - 2 - heptene, 1,2,3,4,7,7-hexachloro-5-N-propyl carboxamide bicyclo [2.2.1]-2-heptene, 1,2,3,4,-7,7 - hexachloro - 5 - N - isopropyl carboxamide bicyclo [2.2.1]-2-heptene, 1,2,3,4,7,7-hexachloro-5-N-butyl carboxamide bicyclo [2.2.1]-2-heptene, 1,2,3,4,7,7-hexachloro-5-N-isobutyl carboxamide bicyclo [2.2.1]-2-heptene, 1,2,3,4,7,7-hexachloro-5-N-t-butyl carboxamide bicyclo [2.2.1] - 2 - heptene, 1,2,3,4,7,7 - hexachloro - 5-methyl - 5 - N - methyl carboxamide bicyclo [2.2.1] - 2-heptene, 1,2,3,4,7,7-hexachloro-5-methyl-5-N-propyl carboxamide bicyclo [2.2.1]-2-heptene, 1,2,3,4,7,7-hexachloro - 5 - methyl - 5 - N - isopropyl carboxamide bicyclo [2.2.1] - 2-heptene, 1,2,3,4,7,7-hexachloro-5-methyl-5-N-butyl carboxamide bicyclo [2.2.1]-2-heptene, 1,2,3,4,7,7-hexachloro - 5 - methyl-5-N-isobutyl carboxamide bicyclo

[2.2.1]-2-heptene, 1,2,3,4,7,7-hexachloro-5-methyl-5-N-t-butyl carboxamide bicyclo [2.2.1]-2-heptene, etc., 1,2,3,4,7,7-hexachloro-5-N-methyl carboxamide-6-methylbicyclo [2.2.1]-2-heptene, 1,2,3,4,7,7-hexachloro-5-N-ethyl carboxamide-6-methylbicyclo [2.2.1]-2-heptene, 1,2,3,4,7,7-hexachloro-5-N-propyl carboxamide-6-methylbicyclo [2.2.1]-2-heptene, 1,2,3,4,7,7-hexachloro-5-N-isopropyl carboxamide-6-methylbicyclo [2.2.1]-2-heptene, 1,2,3,4,7,7-hexachloro-5-N-butyl carboxamide-6-methylbicyclo [2.2.1]-2-heptene, 1,2,3,4,7,7-hexachloro-5-N-isobutyl carboxamide-6-methylbicyclo [2.2.1]-2-heptene, 1,2,3,4,7,7-hexachloro-5-N-t-butyl carboxamide-6-methylbicyclo [2.2.1]-2-heptene, etc., 1,2,3,4,7,7-hexachloro-5-chloromethyl-5-N-methyl carboxamide bicyclo [2.2.1]-2-heptene, 1,2,3,4,7,7-hexachloro-5-chloromethyl-5-N-ethyl carboxamide bicyclo [2.2.1]-2-heptene, 1,2,3,4,7,7-hexachloro-5-chloromethyl-5-N-propyl carboxamide bicyclo [2.2.1]-2-heptene, 1,2,3,4,7,7-hexachloro-5-chloromethyl-5-N-butyl carboxamide bicyclo [2.2.1]-2-heptene, 1,2,3,4,7,7-hexachloro-5-chloromethyl-5-N-t-butyl carboxamide bicyclo [2.2.1]-2-heptene, etc., 1,2,3,4,7,7-hexachloro-5,6-dichloromethyl-5-N-methyl carboxamide bicyclo [2.2.1]-2-heptene, 1,2,3,4,7,7-hexachloro-5,6-dichloromethyl-5-N-ethyl carboxamide bicyclo [2.2.1]-2-heptene, 1,2,3,4,7,7-hexachloro-5,6-dichloromethyl-5-N-propyl carboxamide bicyclo [2.2.1]-2-heptene, 1,2,3,4,7,7-hexachloro-5,6-dichloromethyl-5-N-t-butyl carboxamide bicyclo [2.2.1]-2-heptene, 1,2,3,4,7,7-hexachloro-5-trichloromethyl-6-N-methyl carboxamide bicyclo [2.2.1]-2-heptene, 1,2,3,4,7,7-hexachloro-5-trichloromethyl-6-N-ethyl carboxamide bicyclo [2.2.1]-2-heptene, 1,2,3,4,7,7-hexachloro-5-trichloromethyl-6-N-propyl carboxamide bicyclo [2.2.1]-2-heptene, 1,2,3,4,7,7-hexachloro-5-trichloromethyl-6-N-butyl carboxamide bicyclo [2.2.1]-2-heptene, 1,2,3,4,7,7-hexachloro-5-trichloromethyl-6-N-butyl carboxamide bicyclo [2.2.1]-2-heptene. It is to be understood that the aforementioned compounds are merely representative types of compounds, and that the invention is not necessarily limited thereto.

This invention is further illustrated with respect to specific embodiments thereof in the following examples which, however, are not intended to limit the generally broad scope of the present invention in strict accordance therewith.

EXAMPLE I 10 g. (an excess) of hexachlorocyclopentadiene and 4 g. of N-t-butyl acrylamide were placed in a condensation flask and heated to a temperature of approximately 150° C. for a period of 4 hours. At the end of this time, the reaction vessel and contents thereof were cooled to room temperature. The reaction product, comprising 1,2,3,4,-7,7-hexachloro-5-N-t-butyl carboxamide bicyclo [2.2.-]-[2-heptene, settled out as a crystalline mass of long, fine needles, which, after recrystallization from benzene, melted at 144° C.

EXAMPLE II

The product prepared in Example I, namely, 1,2,3,4,7,7-hexachloro-5-N-t-butyl carboxamide bicyclo [2.2.1]-2-heptene was tested to show the pesticidal and herbicidal activity of the compound using houseflies, bean beetle larvae, pea aphids and mites as test insects are set forth in Table I below.

*Table I*

| Housefiles percent dead, 24 hrs., 1% dil. | Bean Bettle Larvae percent dead, 48 hrs., 1% dil. | Pea Aphids, percent dead, 48 hrs., 1% dil. | Mites, percent dead, 5 days, 0.5% dil. |
|---|---|---|---|
| 30 | 80 | 100 | ᵃ 0 |

ᵃ The instant compound was sprayed on the leaves of Wood's Prolific Lime Bean Seedlings and was found to be phytotoxic thereto.

I claim as my invention:

1. The new compound 1,2,3,4,7,7-hexachloro-5-N-t-butyl carboxamide bicyclo [2.2.1]-2-heptene.
2. The new compound 1,2,3,4,7,7-hexachloro-5-methyl-5-N-t-butyl carboxamide bicyclo [2.2.1]-2-heptene.
3. The new compound 1,2,3,4,7,7-hexachloro-5-N-ethyl carboxamide bicyclo [2.2.1]-2-heptene.
4. The new compound 1,2,3,4,7,7-hexachloro-5-N-t-butyl carboxamide-6-methylbicyclo [2.2.1]-2-heptene.
5. The new compound 1,2,3,4,7,7-hexachloro-5-chloromethyl-5-N-t-butyl carboxamide bicyclo [2.2.1]-2-heptene.
6. A 1,2,3,4,7,7-hexachloro-5-N-alkyl carboxamide bicyclo [2.2.1]-2-heptene in which said alkyl group contains from 1 to 6 carbon atoms.

References Cited in the file of this patent

UNITED STATES PATENTS

| | | |
|---|---|---|
| 2,352,606 | Alder et al. | July 4, 1944 |
| 2,415,453 | Thomas | Feb. 11, 1947 |
| 2,657,166 | Stonecipher | Oct. 27, 1953 |
| 2,657,168 | Buntin | Oct. 27, 1953 |
| 2,758,918 | Soloway et al. | Aug. 14, 1956 |

OTHER REFERENCES

Prill: J. A. C. S., vol. 69, page 62, 1947.
Parnham et al.: J. A. C. S., vol. 73, page 5068, 1951.
Roberts et al.: J. A. C. S., vol. 72, page 3122, 1950.